(12) United States Patent
Schmisseur et al.

(10) Patent No.: US 7,197,605 B2
(45) Date of Patent: Mar. 27, 2007

(54) ALLOCATING CACHE LINES

(75) Inventors: Mark A. Schmisseur, Phoenix, AZ (US); Brett W. Gaines, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 10/335,204

(22) Filed: Dec. 30, 2002

(65) Prior Publication Data

US 2004/0128452 A1 Jul. 1, 2004

(51) Int. Cl.
*G06F 12/08* (2006.01)

(52) U.S. Cl. ............... 711/144; 711/141; 711/145; 711/156

(58) Field of Classification Search ........... 711/141, 711/145, 144, 135, 132, 156
See application file for complete search history.

(56) References Cited

U.S. PATENT DOCUMENTS

| | | | | |
|---|---|---|---|---|
| 6,070,231 A | * | 5/2000 | Ottinger | 711/141 |
| 6,108,752 A | * | 8/2000 | VanDoren et al. | 711/117 |
| 6,438,660 B1 | * | 8/2002 | Reams | 711/143 |
| 6,564,301 B1 | * | 5/2003 | Middleton | 711/144 |
| 2002/0083271 A1 | * | 6/2002 | Mounes-Toussi | 711/144 |
| 2002/0170014 A1 | * | 11/2002 | Kocol et al. | 714/763 |
| 2004/0024969 A1 | * | 2/2004 | Chauvel et al. | 711/132 |
| 2004/0128447 A1 | * | 7/2004 | Lai | 711/133 |

FOREIGN PATENT DOCUMENTS

EP 0 825 538 2/1998

OTHER PUBLICATIONS

U.S. Appl. No. 60/400,391,filed Jul. 31, 2002, Chauvel et al.*
Jouppi, "Cache Write Policies and Performance", *IEEE Computer Society; Proc. of 20th Annual International Symposium on Computer Architecture*, May 16-19, 1993, San Diego, CA, USA, pp. 191-201.
U.S. Appl. No. 60/400,391, Chauvel et al., Entitled "JSM Protection," 37 pages.

* cited by examiner

*Primary Examiner*—Pierre-Michel Bataille
(74) *Attorney, Agent, or Firm*—Fish & Richardson P.C.

(57) ABSTRACT

Allocating cache lines includes incurring a cache write miss and, after incurring the cache write miss, writing data having a memory address to a cache line that does not include data at the memory address and that includes only invalid data.

23 Claims, 4 Drawing Sheets

ALLOCATING CACHE LINES

BACKGROUND

A processor in a computer system may receive a request for data at a requested location in memory. The processor may first attempt to access the data in a memory closely associated with the processor, such as a cache, rather than through a typically slower access to main memory. Generally, a cache includes memory that emulates selected regions or blocks of a larger, slower main memory. A cache is typically filled on a demand basis, is physically closer to a processor, and has faster access time than main memory.

If the processor's access to memory "misses" in the cache, e.g., cannot find a copy of the data in the cache, the cache selects a location in the cache to store a copy of the data at the requested location in main memory, issues a request to the main memory for the data at the requested location, and fills the selected cache location with the data from main memory. The cache may also request and store data located spatially near the requested location as programs that request data often make temporally close requests for data from the same or spatially close memory locations, so it may increase efficiency to include spatially near data in the cache. In this way, the processor may access the data in the cache for this request and/or for subsequent requests for data.

DESCRIPTION

Figure 1:
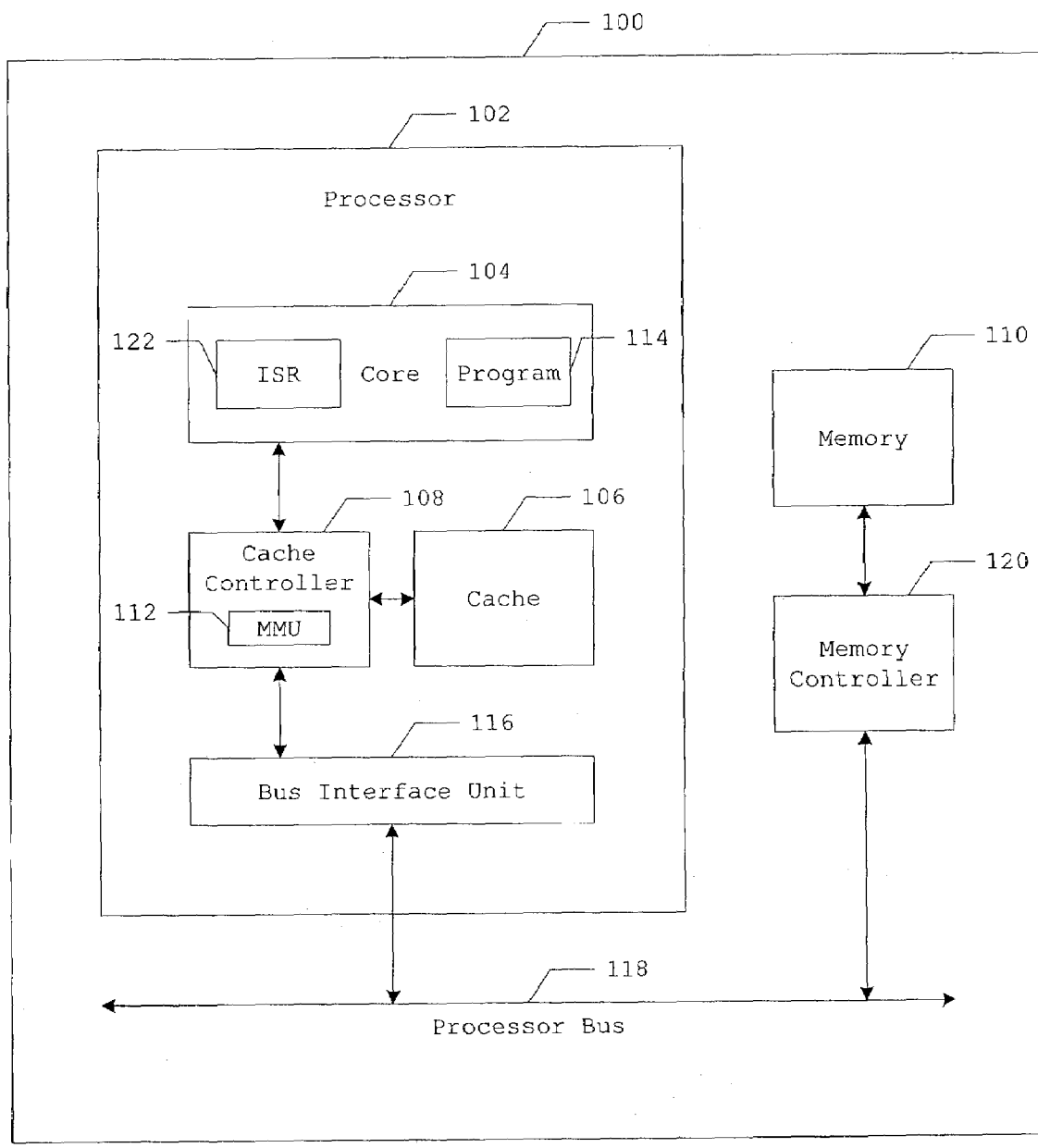
FIG. 1 is an example processing system including a cache.

Referring to FIG. 1, an example processing system 100 includes a processor 102 that can automatically allocate a line in a cache 106 without filling the line with current data from a memory 110 before writing data to the allocated line. A processor core 104 included in the processor 102 can allocate a line in the cache 106 according to one or more policies included in a cache controller 108 associated with the cache 106.

The cache controller 108 manages policies for retrieving data from the memory 110 and placing the data in the cache 106 and policies for retaining data in the cache 106 and updating the memory 110 with updates to the cache 106. The cache controller 108 typically implements such policies using a memory manager unit (MMU) 112 included in the cache controller 108. One of these policies can include a write allocate empty policy.

The write allocate empty policy can operate as a write allocate policy, alone or in addition to one or more other write allocate policies for the cache 106, initiating when the core 104 incurs a cache miss by a core write. A cache miss typically occurs when the processor 102, through a program 114 included in the core 104, attempts to read, write, or otherwise access a particular piece or block of data in the cache 106 through the cache controller 108 but cannot locate the data in the cache 106 because the data has not been copied from the memory 110 to the cache 106.

Under the write allocate empty policy controlled by the cache controller 108, the program 114 can allocate a line in the cache and write data to the allocated line without first fetching a current version of the data from the memory 110. Line allocation generally refers to performing some or all of selecting a line to victimize in the process of executing a cache fill operation, writing cache contents in the victimized line to the memory 110 if the contents have been modified since being copied from the memory 110, and updating tag information for the cache 106 to reflect any changes in memory addresses for the victimized and/or new contents of the selected cache line. For example, the processor 102 may allocate a cache line by selecting one of the cache's cache lines and victimize the current data at the selected cache line by marking the contents at the selected cache line as invalid and by writing the contents at the selected cache line back to the memory 110 if the copy of the data in the cache 106 includes updates or modifications not yet reflected in the memory 110.

Figure 2:
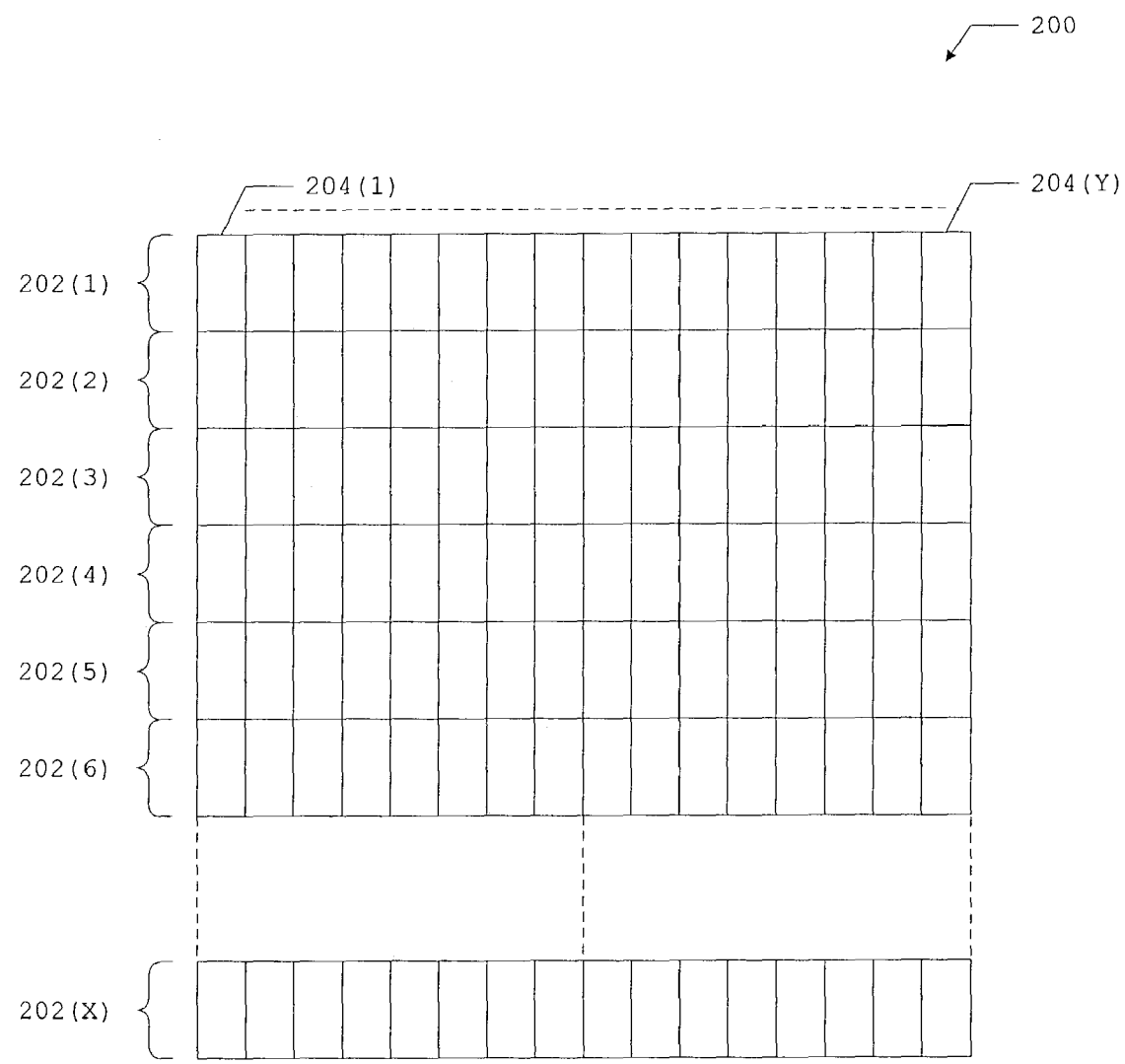
FIG. 2 shows an example cache including cache lines.

FIG. 2 shows an example of a cache 200 including cache lines 202(1)–202(X), where X equals any positive whole number. The cache 106 (FIG. 1) may be implemented similar to the cache 200. Each of the cache lines 202(1)–202(X) includes bytes 204(1)–204(Y) of data, where Y equals any positive whole number. (The bytes 204(1)–204(Y) are illustrative bytes for cache line 202(1); each of the cache lines 202(1)–202(X) includes Y bytes of data.) Each of the Y bytes of data may include any amount of bytes, each of the Y bytes typically including the same number of bytes each. Y is measured in bytes in this example, but Y may be measured in any way, such as by bits, bytes, or by any other data size. The cache lines 202(1)–202(X) are shown in contiguous horizontal rows in this example, but cache lines may be organized in any way.

Referring again to FIG. 1, rather than the processor 102 requesting data from the memory 110 via the core 104, cache controller 108, a bus interface unit 116, a processor bus 118, a memory controller 120, and any other intervening elements (e.g., buses, chips, etc.) and filling the selected cache line with a current version of the data from the memory 110, the program 114 marks the data in the selected cache line as invalid. The program 114 may then write data to the selected cache line and mark the data written as valid. If a processor interrupt occurs during the writing of data to the cache line, an interrupt software routine (ISR) 122 included in the core 104 can help ensure that the interrupt is properly dealt with before continuing to write data to the cache 106. The program 114 can also update the memory 114 with the newly written, valid data in one or more cache line writes to the memory 110.

Enabling a cache line to be marked as invalid before writing data to a cache line after a cache miss rather than filling the cache line with the current version of the data from the memory 110 before writing data to the cache line can reduce bus traffic and processing time in the system 100. Data need not be fetched from the memory 110 and stored in the cache after a cache miss only to be written over by the processor 102. The core 104 or the program 114 need not include any special instructions on cache accesses to follow the write allocate empty policy.

In addition to the write allocate empty policy, the MMU 112 may also implement cache policies involving retrieval (line allocation) functions and updating (write) functions. Retrieval functions generally include filling the cache 106 on demand using policies such as read allocate policies, write allocate policies, and read/write allocate policies. A read allocate policy generally refers to the core 104 fetching a cache line worth of data from the memory 110 if the data being read is not already in the cache 106 (i.e., a cache miss). A write allocate policy generally refers to the core 104 fetching a cache line worth of data from the memory 110 if data being written is not already in the cache 106 (i.e., a cache miss). A read/write allocate policy generally refers to a combination of read allocate and write allocate policies for data that had characteristics of both reads and writes.

Updating functions generally include updating the memory 110 with changed data in the cache 106 using policies such as write through policies and write back policies. A write through policy generally refers to the core 104 updating the cache 106 and external memory and/or external devices when data being written to the cache 106 is included in the cache 106 (i.e., a cache hit). A write back policy generally refers to the core 104 updating the cache 106 but not external memory or external devices when data being written to the cache is included in the cache 106 (i.e., a cache hit).

Furthermore, the cache controller 108 may allow any number and any type of mechanisms able to access the cache 106 to follow the write allocate empty policy. For example, the cache controller 108 may implement the write allocate empty policy for one or more processors, one or more input/output (I/O) devices, and/or one or more other types of similar mechanisms.

Before further discussing allocation of cache lines, the elements in the system 100 are further described. The elements in the system 100 can be implemented in a variety of ways.

The system 100 may include a network system, a computer system, a high integration input/output (I/O) subsystem on a chip, or other similar type of communication, machine, computing, or processing system.

The processor 102 can include any processing mechanism such as a microprocessor or a central processing unit (CPU). The processor 102 may include one or more individual processors. The processor 102 may include a network processor, a general purpose embedded processor, or other similar type of processor.

The cache 106 can include any memory mechanism capable of bridging a processing mechanism (e.g., the processor 102) and a main memory (e.g., the memory 110). The cache 106 typically has a faster access time than the main memory. The cache 106 may include a dedicated cache, random access memory (RAM) such as static RAM, a buffer, a memory bank, a queue, or other similar memory mechanism. The cache 106 may include an independent mechanism or a reserved section of main memory.

The cache 106 may include any number of levels. For example, the cache 106 may include a level one (L1) cache built into the processor 102 as shown in the system 100. The cache 106 may also include a level two (L2) cache, a secondary staging area that feeds an L1 cache. The L2 cache may be built into the processor 102, reside on a separate chip in a multichip package module outside the processor 102, or be a separate bank of chips outside the processor 102.

Instructions and data are typically communicated to and from the cache 106 in blocks. A block generally refers to a collection of bits or bytes communicated or processed as a group. A block may include any number of words, and a word may include any number of bits or bytes. The cache 106 may store the blocks in cache lines, such as in those shown in the cache 200 of FIG. 2.

A cache line generally includes a single data entry. A cache line may contain data corresponding to one or more addresses in the memory 110. Each cache line may be any size, e.g., thirty-two bytes wide, sixty-four bytes wide, or any other size (typically measured in bits and/or bytes).

The MMU 112 may include a virtual memory circuit that can translate logical addresses into physical addresses and store cache access policies. The MMU 112 may be part of the processor 102 as shown in this example system 100 or the MMU 112 may be a separate mechanism or chip.

The MMU 112 may include an amount of memory storing one or more tables called page tables that match virtual addresses of data in the cache 106 to the data's physical addresses in the memory 110. The page tables may also organize definitions of blocks in the cache 106 for the program 114 included in the core 104 to set up. The definitions, called attribute bits, define characteristics of the blocks for each entry in the page tables such as cacheable/non-cacheable and various cache access policies. The core 104 may send requests for data to the MMU 112, and the MMU 112 can determine based on the main memory address of the data whether the data is in the cache 106 or if the data needs to be fetched from the memory 110. If the data is not in the memory 110, the MMU 112 may issue a page fault interrupt.

The cache controller 108 generally includes any mechanism capable of communicating with the core 104, the cache 106, and the bus interface unit 116. The cache controller 108 may include one or more chips.

The bus interface unit 116 can include any software, hardware, or software and hardware combination capable of communicating information between the cache controller 108 and the processor bus 118.

The program 114 and the ISR 122 may each include any number of and any type of instructions, routines, applications, and/or programs for the core 104 to execute and/or perform.

The processor bus 118 (and any other buses included in the system 100) can include any communication channel, pathway, or link capable of carrying information between at least the processor 102 and the memory controller 120. The bus 118 can have any width, e.g., sixteen bits, thirty-two bits, sixty-four bits, etc, and may run at any speed, e.g., thirty-three Mega Hertz (MHz), 100 MHz, etc. The bus 118 may have a sideband feature in which the bus 118 includes parallel channels that can each simultaneously carry data and/or address information.

The memory 110 can include any storage mechanism. Examples of the memory 110 include random access memory (RAM) such as dynamic RAM or static RAM, read only memory (ROM), flash memory, tapes, disks, buffers, and other types of similar storage mechanisms. The memory 110 may include one storage mechanism, e.g., one RAM chip, or any combination of storage mechanisms, e.g., multiple RAM chips.

The memory controller 120 can include any mechanism capable of communicating with and managing the memory 110. The memory controller 120 may be included in the memory 110 or may be an independent mechanism. The memory controller 120 may include one or more chips.

Furthermore, the system 100 is simplified for ease of explanation. The system 100 may include more or fewer elements such as one or more storage mechanisms (caches, memories, databases, buffers, etc.), bridges, chipsets, graphics mechanisms, display devices, I/O devices, communication links (buses, wireless links, etc.), and other similar types of elements that may be included in a system, such as a computer system, similar to the system 100. I/O devices generally include devices used to transfer data into and/or out of a computer system. Examples of I/O devices include mice, keyboards, printers, display devices such as monitors, disk drives, graphics devices, joysticks, paddles, Zip drives, scanners, CD drives, DVD drives, modems, cameras, video devices, microphones, and other similar types of internal, external, and internal/external devices.

Figure 3:
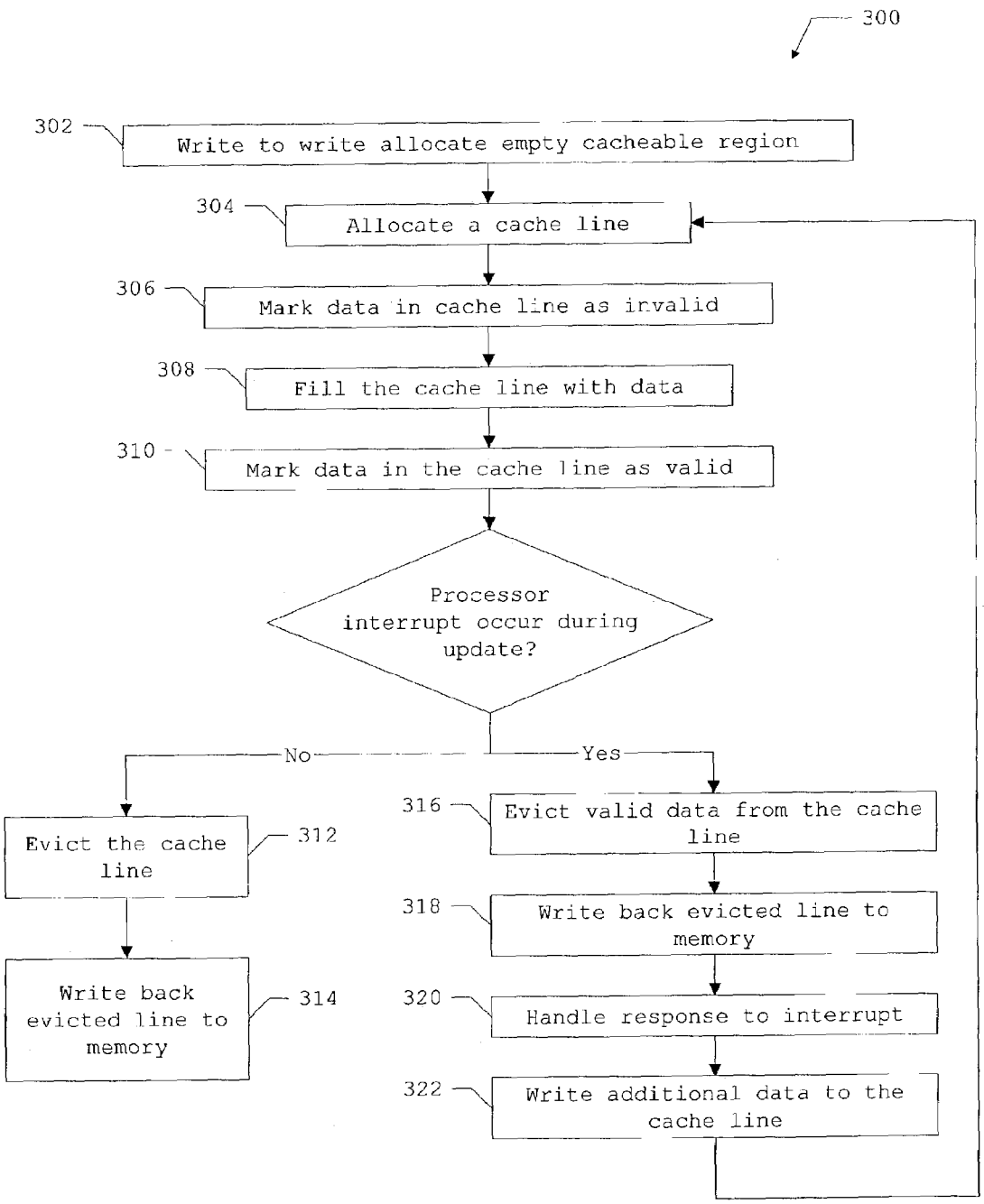
FIG. 3 shows an example process of allocating cache lines.

FIG. 3 shows an example process 300 of allocating cache lines. Although the process 300 is described with reference to the elements included in FIG. 1, this or a similar process, including the same, more, or fewer elements, reorganized or not, may be performed in the system of FIG. 1 or in another, similar system.

Generally, the process 300 illustrates a write allocate empty cache policy that may be controlled by the MMU 112. On a cache miss by a core write, the core 104 does not fetch the current data from the memory 110 to fill a cache line before writing the data but instead marks all data in a cache line as invalid and writes the data to the cache line, marking the written data as valid. The core 104 may then evict valid data from the cache line and write the data back to the memory 110 in a single cache line write back to the memory 110.

In the process 300, the core program 114 writes 302 data to a "write allocate empty" cacheable region in the cache 106. The program 114 may write to a write allocate empty cacheable region by incurring a cache miss by a core write, e.g., the program 114 has data to write to the cache 106 but incurs a cache miss because the data is not already included in the cache 106. The region is determined to be a write allocate empty cacheable region per a MMU policy and is typically indicated as a write empty cache region in a page table.

The cache controller 108 allocates 304 a cache line for the data in the cache 106 and marks 306 data included in the cache line as invalid. The program 114 fills 308 the cache line by writing data to the cache line. Because the data in the cache line is marked invalid before writing data to the cache line, the cache controller 108 allows the program 114 to write data to the cache line. The program 114 marks 310 the data written to the cache line as valid. The program 114 may mark the data valid as it writes data to the cache line or it may mark data valid after writing all or a specified portion of the data to the cache line.

The program 114 may incur an interrupt before filling the cache line with all the data to be written. An interrupt generally refers to an occurrence of an event requiring immediate or higher priority attention than the action currently being performed. If a processor interrupt occurs, the ISR 122 may send a signal to the program 114 signaling an interrupt to the program 114 so the program 114 can end or temporarily stop before resuming activity after the ISR 122 handles the interrupt.

If an interrupt does not occur during the writing of data, then the program 114 was able to write all data to be written to the allocated cache line (barring any unusual or interfering activity such as power loss, system failure, etc.). The program 114 evicts 312 the cache line, typically in a manual eviction. The program 114 typically evicts all the bytes in the cache line although only a portion of the data may be evicted, e.g., only those bytes marked as valid. Eviction generally includes marking all data in the cache line as invalid or otherwise marking the cache line as available for the reading and/or writing of data. Eviction of the cache line may occur, however, when the program 114 allocated 304 a cache line, in which case the program does not evict the cache line at this point.

The program 114 may write back 314, e.g., copy or send, the data evicted from the cache line to the memory 110 so that the memory 110 includes an up-to-date version of the data. This write back may take place at any time after writing the data to the cache line, including before an actual eviction of the data.

If the process 300 is used in a system including multiple caches, perhaps in support of multiple processors or a combination or processors and I/O subsystems, any protocol may be used for checking the multiple caches and maintaining a coherent version of each memory address. Writing data back to the memory 110 may also include writing copies of the data to other caches so all locations storing a copy of the data may have the most up-to-date version of the data.

If an interrupt occurs before the program 114 finishes writing data to the cache line and the core 104 switches from executing the program 114 to executing the ISR 122 to service the interrupt, the core 104 may access the cache 106 and evict data just written by the program 114 from the allocated cache line. The memory 110 may thus be updated with a partial line of data. To help ensure that all of the data is written to the cache 106 and the memory 110, the program 114 may resume writing data to the cache 106 after the ISR 122 completes its handling of the interrupt.

When an interrupt occurs, the program 114 evicts 316 all valid bytes from the allocated cache line that the program 114 was writing data to before occurrence of the interrupt. If data is marked as valid as the program 114 writes the data to the cache line, then the program 114 may evict all data written to the cache line before the interrupt occurred. The program 114 may write back 318 the data evicted from the cache line to the memory 110 at any time after writing the data to the cache line, including before an actual eviction of the data. The core 104 may switch to execute the ISR 122 to handle 320 response to the interrupt.

The program 114 may be configured to not evict 316 and write back 318 at all or only evict and write back after the interrupt is handled by the TSR 122 because eviction and write back may occur in handling the interrupt or as an explicit action (e.g., a manual flush of the cache line on a replacement of data in the cache line). Furthermore, eviction and write back may not occur at all due to occurrence of the interrupt.

After handling the interrupt, the core 104 can return to executing the program 114. The program 114 may write 322 data to the previously allocated cache line that was not written before the interrupt occurred as a completion of the previous write allocate empty policy action.

Whether the program 114 writes data to the previously allocated cache line or not, the program 114 resumes writing data to the cache 106 by allocating 304 a new cache line for the data not written to the cache 106 before the interrupt occurred. The process 300 continues as described above until all the data is written to the cache 106 and written back to the memory 110. In this way, if a partial line is evicted due to an interrupt (or any other disturbance that prevents all data to be written before being evicted from the cache line), the remaining data can be written to a new cache line (which may be the same as a cache line allocated before the interrupt), and when the program 114 evicts the cache line, only the newly written data is written to the memory 110 and the data written by the earlier eviction or evictions will not be overwritten.

Figure 4:
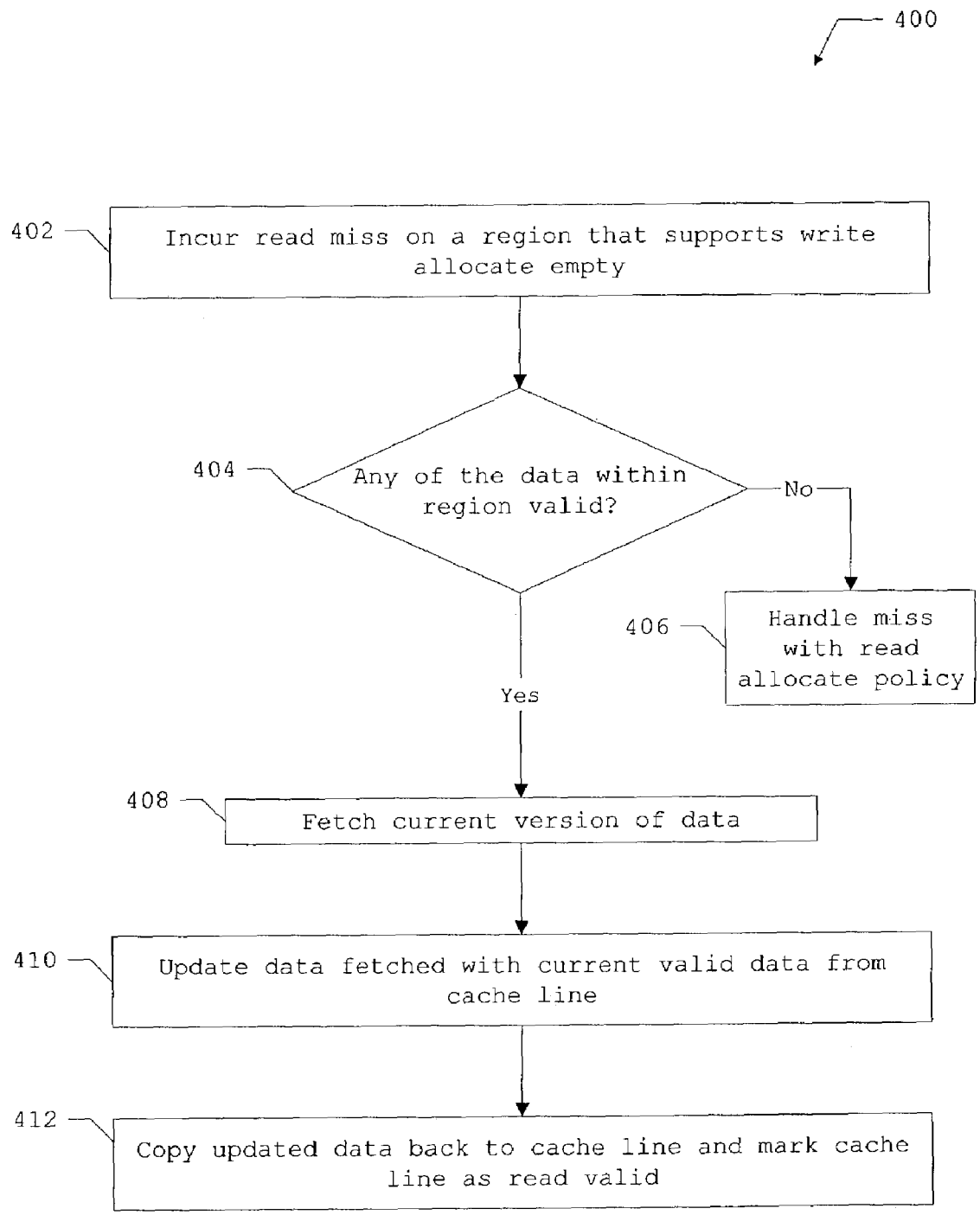
FIG. 4 shows an example process of handling a cache miss on a read.

FIG. 4 shows an example process 400 of handling a cache miss on a read to a region supporting a write allocate empty policy such as the policy illustrated by the process 300 (FIG. 3). Although the process 400 is described with reference to the elements included in FIG. 1, this or a similar process, including the same, more, or fewer elements, reorganized or not, may be performed in the system of FIG. 1 or in another, similar system.

In the process 400, the program 114 incurs 402 a cache miss by a core read to a region (a cache line in this example) supporting a write allocate empty policy. The program 114 determines 404 if any of the data within the region includes valid data. If not, then it is a total cache miss and the program 114 can handle 406 the cache miss per a usual read allocate policy for the cache 106.

If the region does include valid data, then the read miss hit a cache line but corresponds to no data marked valid in the cache line or the read miss was a partial miss that corresponds to some of the data marked as valid in the cache line. The program 114 fetches 408 a current version of the data from the memory 110 (or from whatever agent on the processor bus 118 that holds the most recent version of the data). The program 114 may then update 410 the data fetched with the current valid data in the cache line. The program 114 may also copy 412 the updated data back to cache line and mark the cache line as read valid. In conjunction with a data valid marking, a read valid marking allows only updated data to be written back to the memory 110.

The techniques described are not limited to any particular hardware or software configuration; they may find applicability in any computing or processing environment. The techniques may be implemented in hardware, software, or a combination of the two. The techniques may be implemented in programs executing on programmable machines such as mobile computers, stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD□ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
    allocating a cache line included in a cache for data to be written from a processor, including evicting a the cache line, writing the evicted data to a memory, and marking first data stored at the cache line as invalid;
    marking as invalid first data stored at the cache line;
    writing second data from the processor to the cache line; and
    marking as valid the second data at the cache line while other data at the cache line remains invalid,
    wherein the first data is not a version of the second data.

2. The method of claim 1 further comprising incurring a cache miss before allocating the cache line.

3. The method of claim 1 further comprising, in response to an interrupt occurring during the writing of the second data to the cache line,
    allocating a second cache line in the cache,
    marking as invalid data stored at the second cache line, and
    writing a remainder of the second data to the second cache line.

4. A method comprising:
    incurring, with a processor, a cache write miss with data to be stored at a write target address in a second memory;
    in response to the cache write miss, writing the data from the processor to the cache without fetching a version of the data from the second memory;
    incurring a cache read miss on a read to a cache region that stores second cache data;
    checking validity of the second cache data; and
    in response to the second cache data including invalid data,
        fetching valid data from a read target address,
        updating the second cache data with the valid data, and
        marking the second cache data as valid.

5. The method of claim 4 further comprising, after writing the data to the cache, updating the write target address in the second memory with the data written to the cache.

6. The method of claim 4 further comprising, in response to the cache write miss:
    allocating a cache line to the data; and
    writing the data to the cache line.

7. The method of claim 4 further comprising:
    marking cache data stored at the cache before the cache write miss as invalid before writing the data to the cache; and
    marking the data to be stored at the write target address as valid in the cache.

8. The method of claim 7 further comprising updating the write target address with the data to be stored at the write target address from the cache.

9. The method of claim 4 further comprising, in response to an interrupt occurring during writing of the data to a first cache line in the cache:
    allocating a second cache line,
    marking as invalid data stored at the second cache line, and
    writing a remainder of the data to be stored at the write target address to the second cache line.

10. The method of claim 9 further comprising:
    evicting the second cache line; and
    writing the evicted data to the second memory.

11. The method of claim 4 wherein the cache data stored at the cache before the cache write miss consists of invalid data.

12. An apparatus comprising:
    a cache controller configured to allow operations comprising
        allocating a cache line in a cache, including evicting the cache line, writing the evicted data to a memory, and marking first data stored at the cache line as invalid,
        writing second data from a processor to the cache line, and marking as valid the second data at the cache line while other data at the cache line remains invalid, wherein the first data is not a version of the second data.

13. The apparatus of claim 12 wherein the cache controller allocates the cache line in response to a cache write miss.

14. The apparatus of claim 12 in which the cache controller is also configured to allow operations comprising, in response to an interrupt occurring during the writing of the second data to the cache line, allocating a second cache line in the cache, marking as invalid data stored at the second cache line, and writing a remainder of the second data to the second cache line.

15. The apparatus of claim 12 wherein the second data from the processor comprises data from a processor core.

16. An article comprising a machine-readable medium which contains machine-executable instructions, the instructions operable to cause a machine to perform operations comprising:

incurring, with a processor, a cache write miss with data to be stored at a write target address in a second memory;

in response to the cache write miss, writing the data from the processor to a the cache without fetching a version of the data from the second memory;

incurring a cache read miss on a read to a cache region that stores second cache data;

checking validity of the second cache data; and in response to the second cache data including invalid data, fetching valid data from a read target address, updating the second cache data with the valid data, and marking the second cache data as valid.

17. The article of claim 16, wherein the operations further comprise, after writing the data to the cache line, updating the write target address in the second memory with the data written to the cache.

18. The article of claim 16, wherein the operations further comprise, in response to the cache write miss, allocating a cache line to the data and writing the data to the cache line.

19. The article of claim 16, wherein the operations further comprise:

marking cache data stored at the cache before the cache write miss as invalid before writing the data to be stored at the write target address to the cache; and marking the data to be stored at the write target address as valid in the cache.

20. The article of claim 19, wherein the operations further comprise updating the write target address with the data to be stored at the write target address from the cache.

21. The article of claim 16, wherein the operations further comprise, in response to an interrupt occurring during writing of the data to be stored at the write target address to a first cache line in the cache:

allocating a second cache line, marking as invalid data stored at the second cache line, and writing a remainder of the data to be stored at the write target address to the second cache line.

22. The article of claim 16, wherein the operations further comprise:

evicting the second cache line; and writing the evicted data to the second memory.

23. The article of claim 16 wherein the cache data stored at the cache before the cache write miss consists of invalid data.

* * * * *